(12) United States Patent
Schmidt et al.

(10) Patent No.: US 7,712,564 B2
(45) Date of Patent: May 11, 2010

(54) AIR BOX FOR A MOTORCYCLE

(75) Inventors: Gregory R. Schmidt, Port Washington, WI (US); Joseph R. Konshak, Menomonee Falls, WI (US); Frank Savage, West Bend, WI (US)

(73) Assignee: Harley-Davidson Motor Company Group, LLC, Milwaukee, WI (US)

( * ) Notice: Subject to any disclaimer, the term of this patent is extended or adjusted under 35 U.S.C. 154(b) by 659 days.

(21) Appl. No.: 11/539,827

(22) Filed: Oct. 9, 2006

(65) Prior Publication Data
US 2008/0083577 A1 Apr. 10, 2008

(51) Int. Cl.
*B62D 61/02* (2006.01)
(52) U.S. Cl. .................. 180/219; 180/68.3; 180/225
(58) Field of Classification Search .......... 180/219, 180/225, 69.4, 68.3; 280/834, 835, 288.4, 280/850
See application file for complete search history.

(56) References Cited

U.S. PATENT DOCUMENTS

| | | | | |
|---|---|---|---|---|
| 4,509,613 A | * | 4/1985 | Yamaguchi | 180/219 |
| RE31,994 E | * | 10/1985 | Tominaga et al. | 180/225 |
| 4,653,762 A | * | 3/1987 | Nakamura et al. | 280/835 |
| 5,172,788 A | * | 12/1992 | Fujii et al. | 180/219 |
| 5,330,028 A | * | 7/1994 | Handa et al. | 180/219 |
| 6,170,593 B1 | * | 1/2001 | Hatanaka | 180/219 |
| 6,234,531 B1 | * | 5/2001 | Kurayoshi et al. | 280/835 |
| 6,287,354 B1 | * | 9/2001 | Nozaki | 55/385.3 |
| 7,360,620 B2 | * | 4/2008 | Takenaka et al. | 180/291 |
| 7,422,243 B2 | * | 9/2008 | Kudo et al. | 280/834 |
| 7,441,619 B2 | | 10/2008 | Hatakeyama | |
| 7,549,675 B2 | * | 6/2009 | Satake et al. | 280/835 |
| 2005/0045399 A1 | * | 3/2005 | Kudo et al. | 180/219 |
| 2005/0082113 A1 | * | 4/2005 | Okunosono | 181/227 |
| 2005/0150703 A1 | * | 7/2005 | Nakagome et al. | 180/219 |
| 2006/0065457 A1 | * | 3/2006 | Miyabe et al. | 180/219 |
| 2007/0056790 A1 | * | 3/2007 | Shigeta et al. | 180/225 |

* cited by examiner

*Primary Examiner*—Lesley Morris
*Assistant Examiner*—Maurice Williams
(74) *Attorney, Agent, or Firm*—Michael Best & Friedrich LLP (57) ABSTRACT

An air box for a motorcycle including a motorcycle engine and a fuel tank. The air box includes a housing having an inlet configured to receive intake air into the housing and an outlet configured to direct the intake air from the housing to the motorcycle engine. A filter element is coupled to the housing and is configured to separate debris from the intake air. A mounting feature is configured to connect the housing below the fuel tank of the motorcycle.

24 Claims, 10 Drawing Sheets

FIG. 10

AIR BOX FOR A MOTORCYCLE

BACKGROUND

The present invention relates to a motorcycle. In particular, the invention relates to an air box for a motorcycle that mounts below the fuel tank of the motorcycle.

SUMMARY

In one embodiment, the invention provides an air box for a motorcycle including a motorcycle engine and a fuel tank. The air box includes a housing having an inlet configured to receive intake air into the housing and an outlet configured to direct the intake air from the housing to the motorcycle engine. A filter element is coupled to the housing and is configured to separate debris from the intake air. A mounting feature is configured to connect the housing below the fuel tank of the motorcycle.

In another embodiment, the invention provides a motorcycle including an engine, a fuel tank, and an air box. The fuel tank is configured to store fuel to be combusted in the engine. The air box is in fluid communication with the engine and configured to provide intake air to the engine. The air box includes a filter element to separate debris from the intake air. The air box is mounted below the fuel tank.

In yet another embodiment, the invention provides a method of assembling a motorcycle. A motorcycle frame is provided and an engine is mounted in the frame. A fuel tank is mounted to the motorcycle frame. An air box is mounted below the fuel tank. An intake passage is provided through the air box in communication with the engine.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
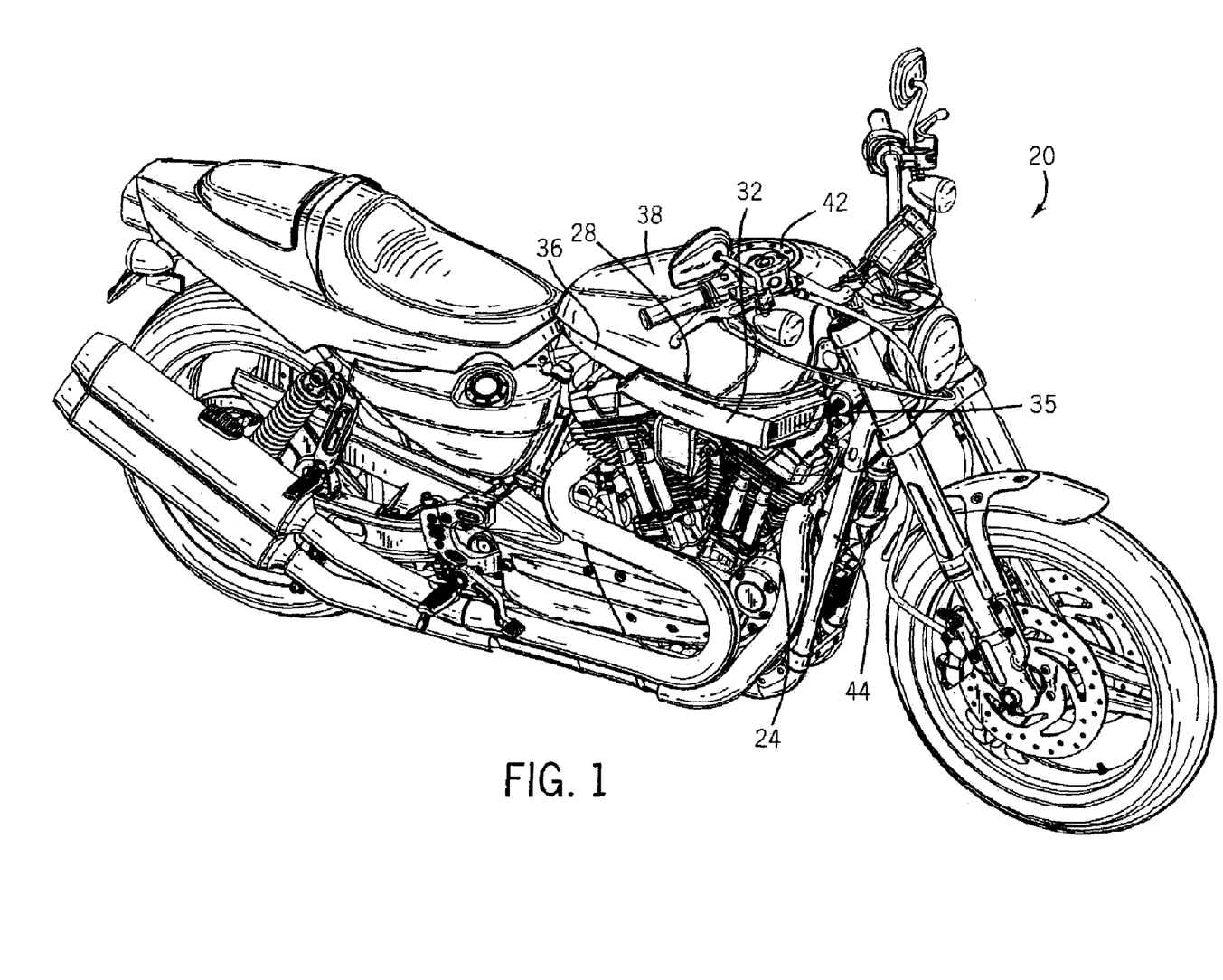
FIG. 1 is a perspective view of a motorcycle of the present invention including an air box coupled to the fuel tank.
Figure 2:
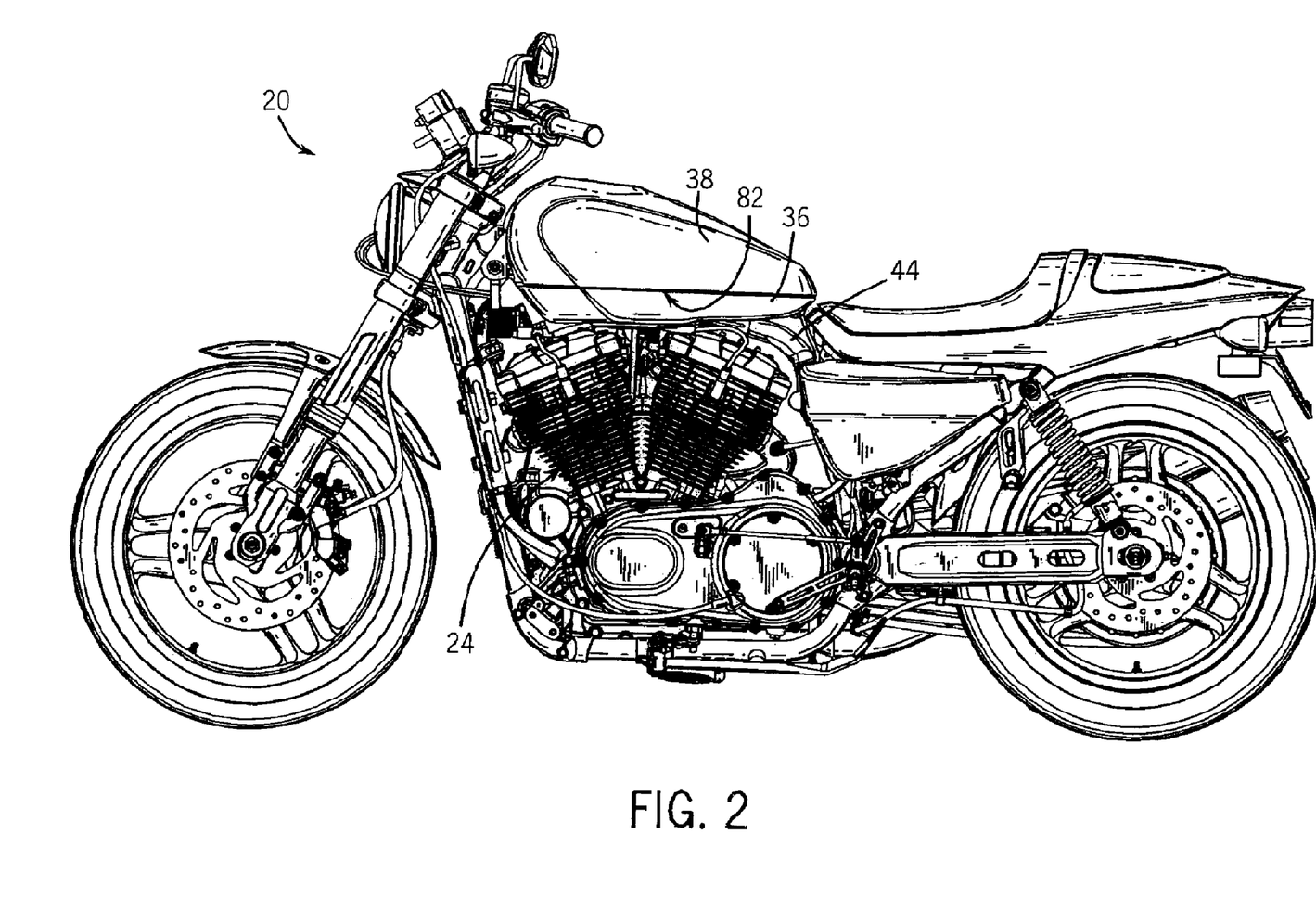
FIG. 2 is a left side view of the motorcycle of FIG. 1.
Figure 3:
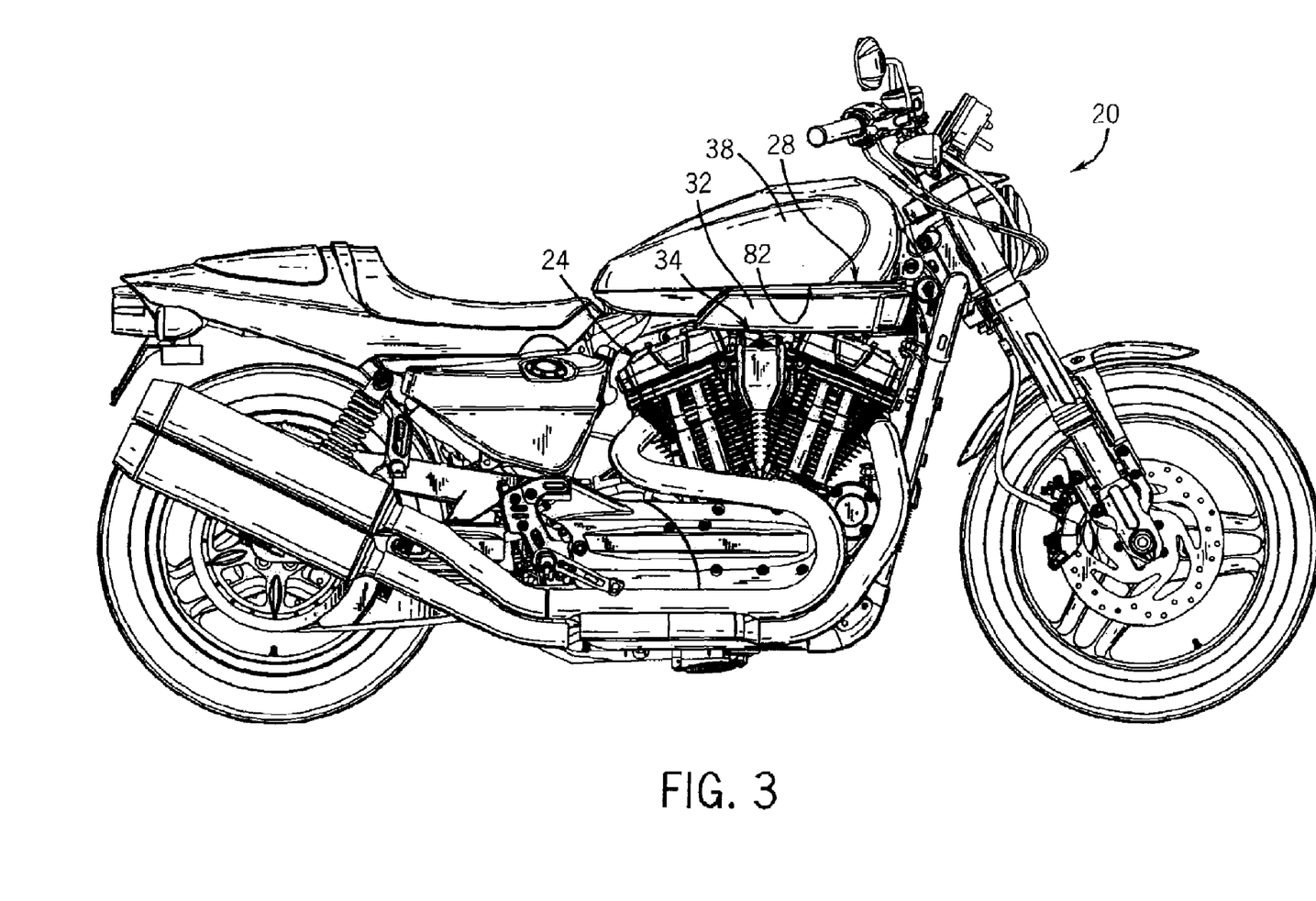
FIG. 3 is a right side view of the motorcycle of FIG. 1.

FIGS. 1-3 illustrate a motorcycle 20 including an engine 24 and an intake system 28 for supplying intake air to the engine 24. The intake system 28 includes an air box assembly (simply referred to hereinafter as the air box 32), a throttle assembly 34 between the air box 32 and the engine 24, and a filter element 35 positioned in the air box 32. The motorcycle 20 also includes a fuel tank 36 configured to store a volume of fuel for the engine 24 and a fuel tank cover 38 for covering the top and sides of the fuel tank 36. The fuel tank 36 includes a filler assembly 42 for accessing the inside of the fuel tank 36 to refuel, etc. The fuel tank 36 includes a longitudinal channel 36A (see FIGS. 5 and 10), which receives a portion of the motorcycle frame 44, to which the fuel tank 36 is mounted.

Figure 4:
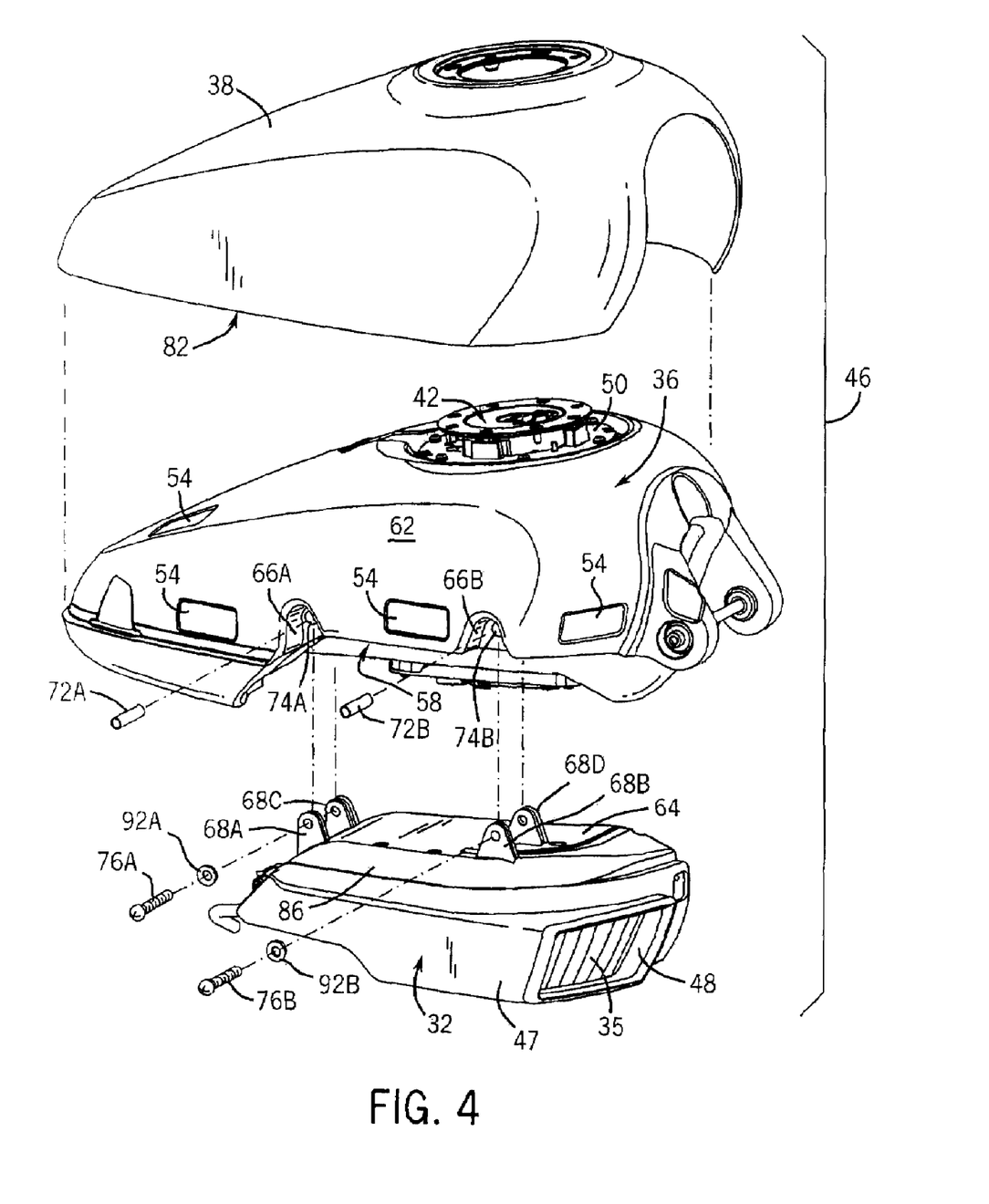
FIG. 4 is an exploded view of a fuel tank, a fuel tank cover, and the air box assembly of the motorcycle of FIG. 1.

FIG. 4 is an exploded assembly view illustrating the air box 32, the fuel tank 36, the fuel tank cover 38, and associated components that make up the tank and air box assembly 46. The air box 32 includes a housing 47 having an inlet opening 48 configured to receive intake air from the atmosphere into the housing 47 and an outlet opening 49 (FIG. 9) configured to supply the intake air to the throttle assembly 34 and the engine 24. The housing 47 defines an intake passage for intake air entering the engine 24. The fuel tank cover 38 is assembled with the fuel tank 36 via threaded fasteners (not shown) that engage an assembly ring 50 adjacent the filler assembly 42. The fuel tank 36 includes a plurality of mounting features 54 for further securing the fuel tank cover 38 thereto. The mounting features 54 are configured to receive adhesive strips (not shown). Alternate methods and components for securing the fuel tank cover 38 to the fuel tank 36 are also within the spirit and scope of the invention.

Figure 5:
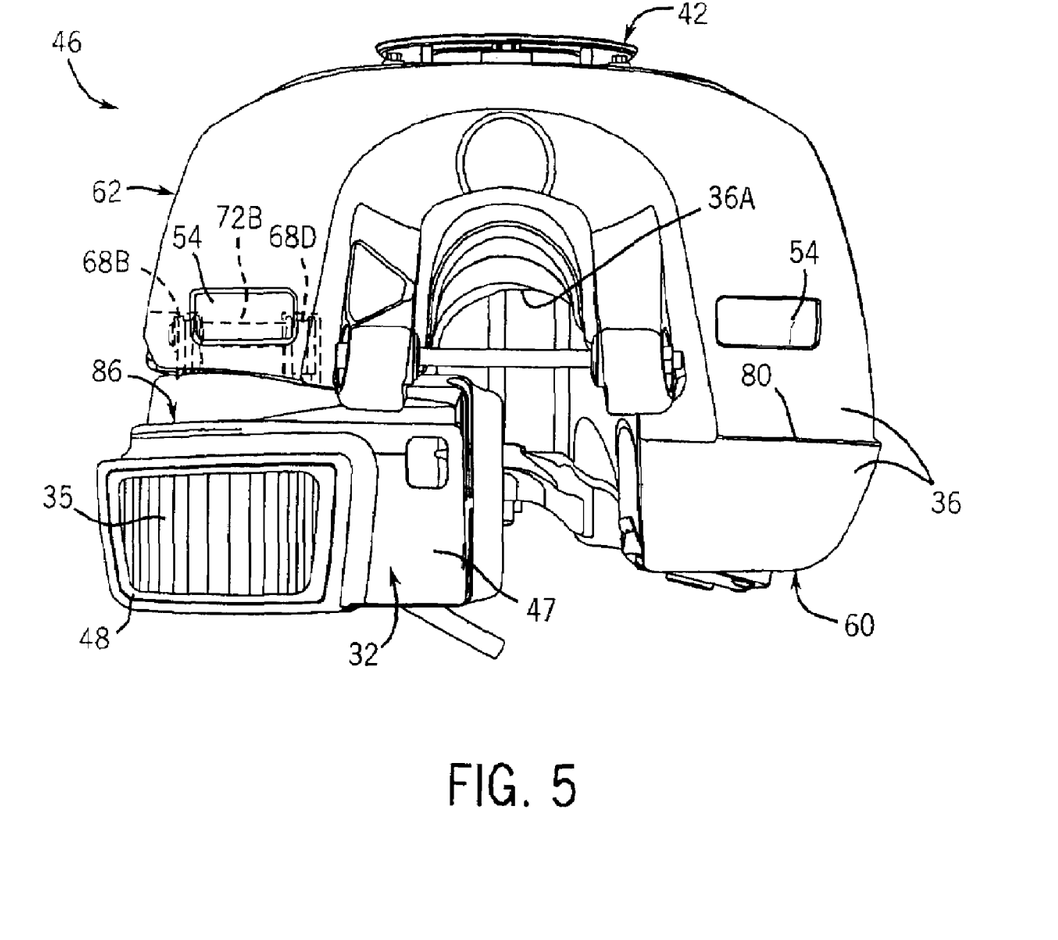
FIG. 5 is a front view of a fuel tank and air box assembly of the motorcycle of FIG. 1.
Figure 6:
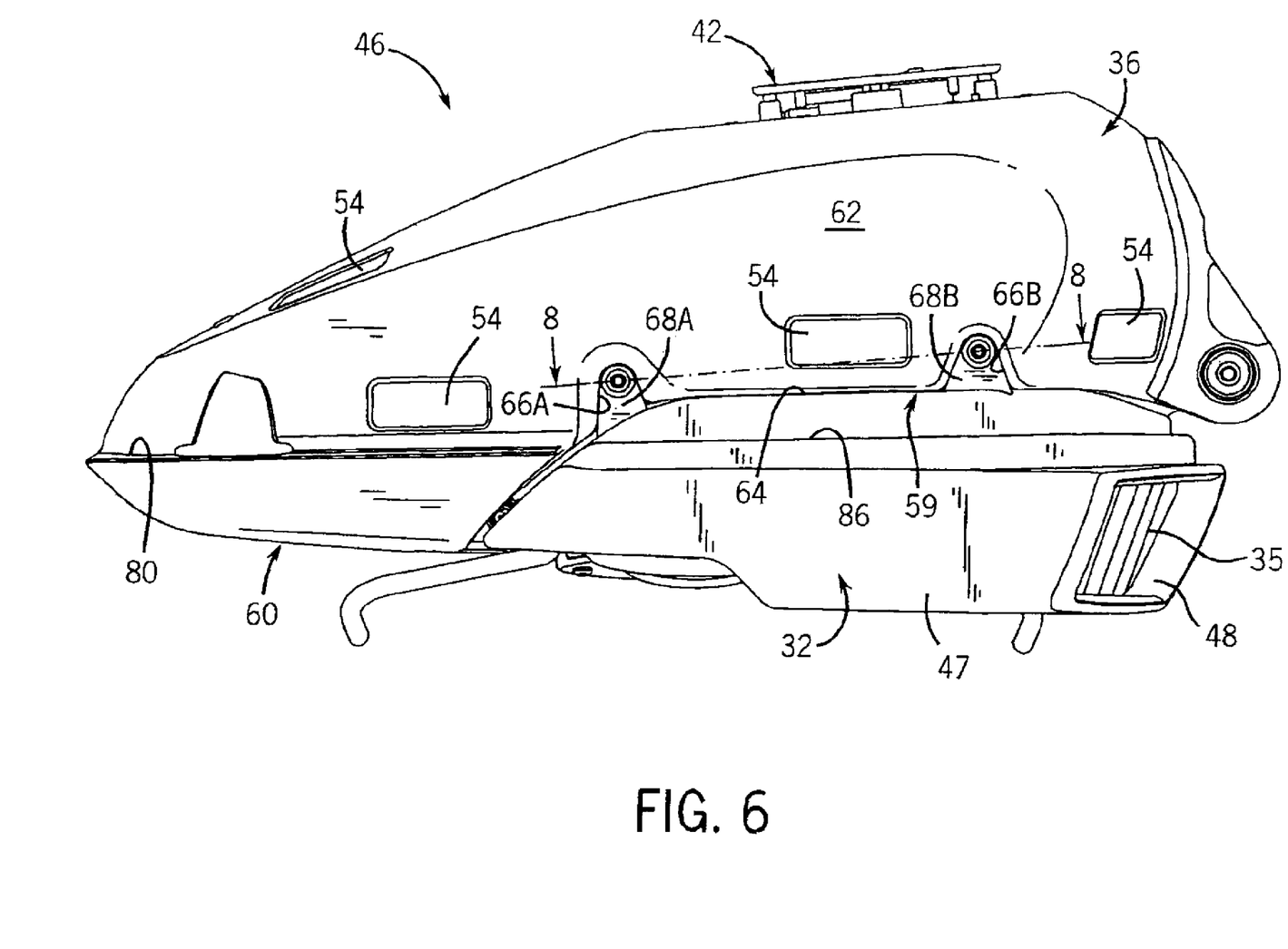
FIG. 6 is a side view of the fuel tank and air box assembly of FIG. 5.
Figure 7:
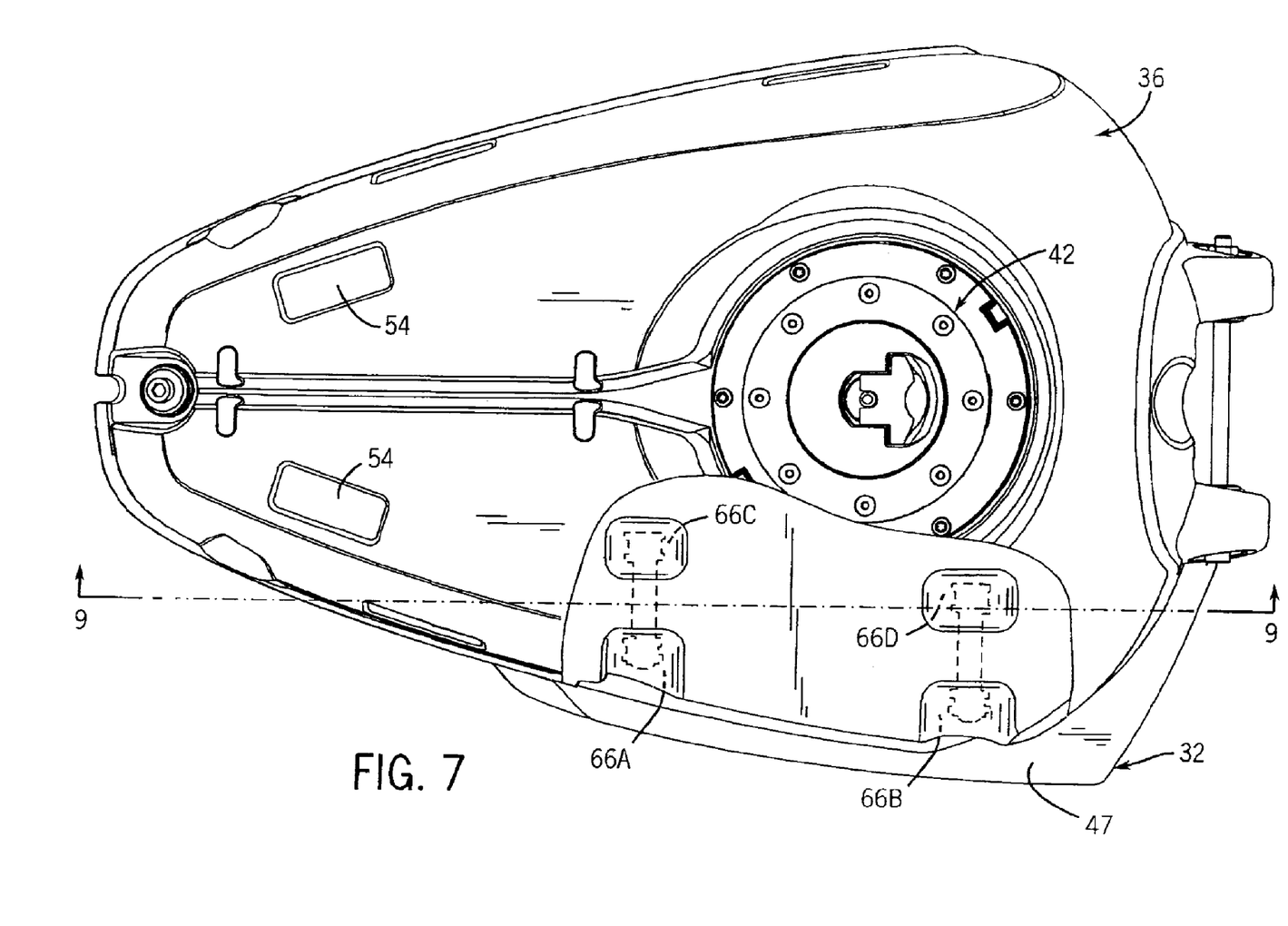
FIG. 7 is a top view of the fuel tank and air box assembly of FIG. 4 with a cutaway showing the inside of the fuel tank.
Figure 10:
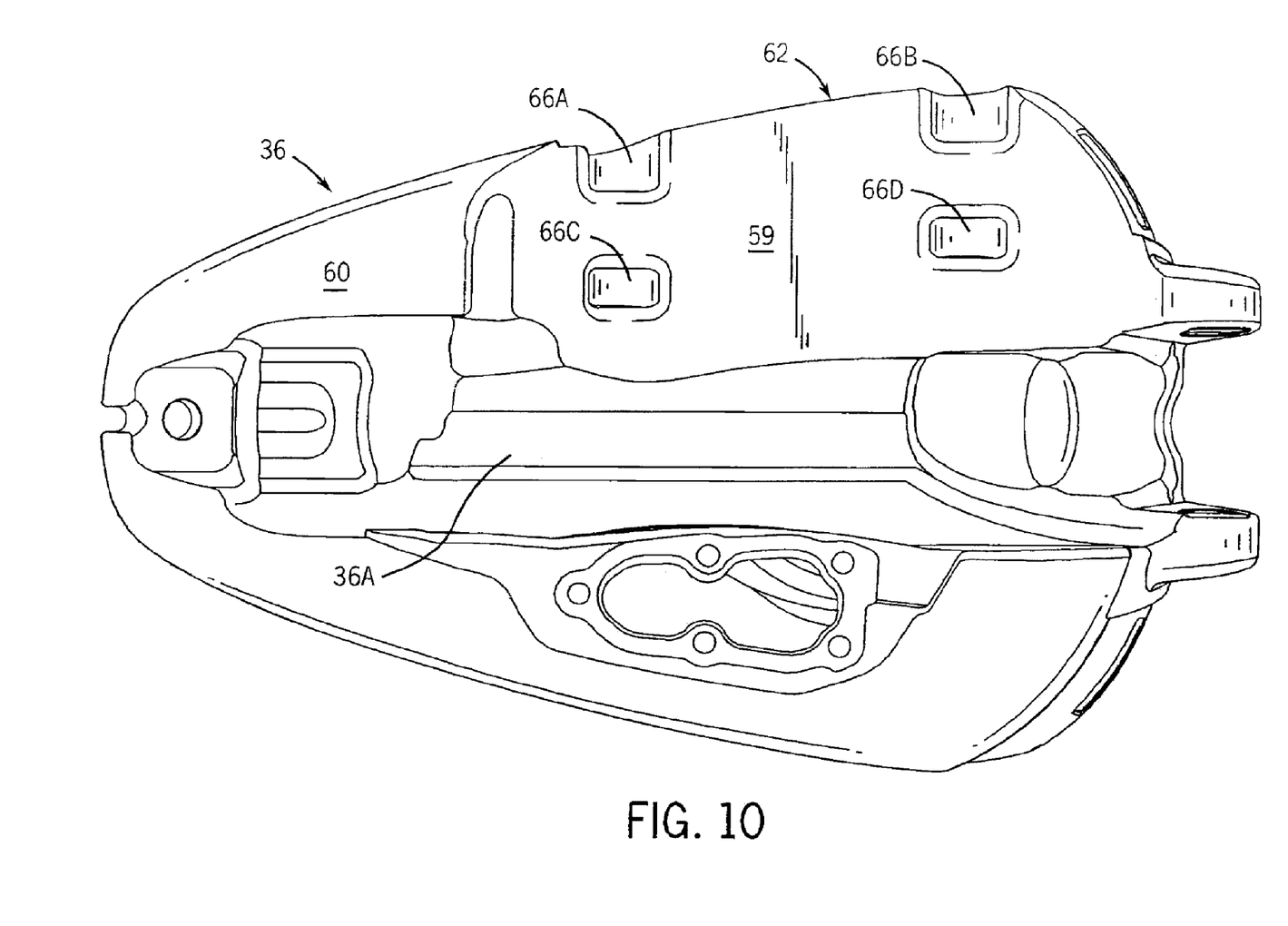
FIG. 10 is a bottom view of the fuel tank of FIG. 4.

With continued reference to FIG. 4, the fuel tank 36 includes a recess 58 in a bottom portion thereof. Referring to FIGS. 6 and 10, the recess 58 includes a surface 59 (i.e., recessed surface) recessed from a lower surface 60 of the fuel tank 36. The recess 58 is positioned on a side of the fuel tank 36, extending laterally to a side wall 62 of the fuel tank 36. The recess 58 is configured to receive the air box 32. When assembled with the fuel tank 36, as best shown in FIGS. 5 and 6, the air box 32 is at least partially "tucked" or "recessed" into the fuel tank 36 by way of the recess 58. The housing 47 includes an upper surface 64 configured to lie adjacent to the recessed surface 59. The fuel tank 36 further includes mounting locations in the form of pockets or mounting recesses 66A, 66B, 66C, and 66D (all of which are shown in FIG. 10). The air box 32 includes mounting features in the form of mounting flanges 68A, 68B, 68C, and 68D formed integrally (e.g., molded as a single piece) with the housing 47, extending upwardly from the upper surface 64 thereof. The mounting recesses 66A, 66B, 66C, and 66D are formed in the fuel tank 36 to receive the mounting flanges 68A, 68B, 68C, and 68D of the air box 32, respectively.

Figure 8:
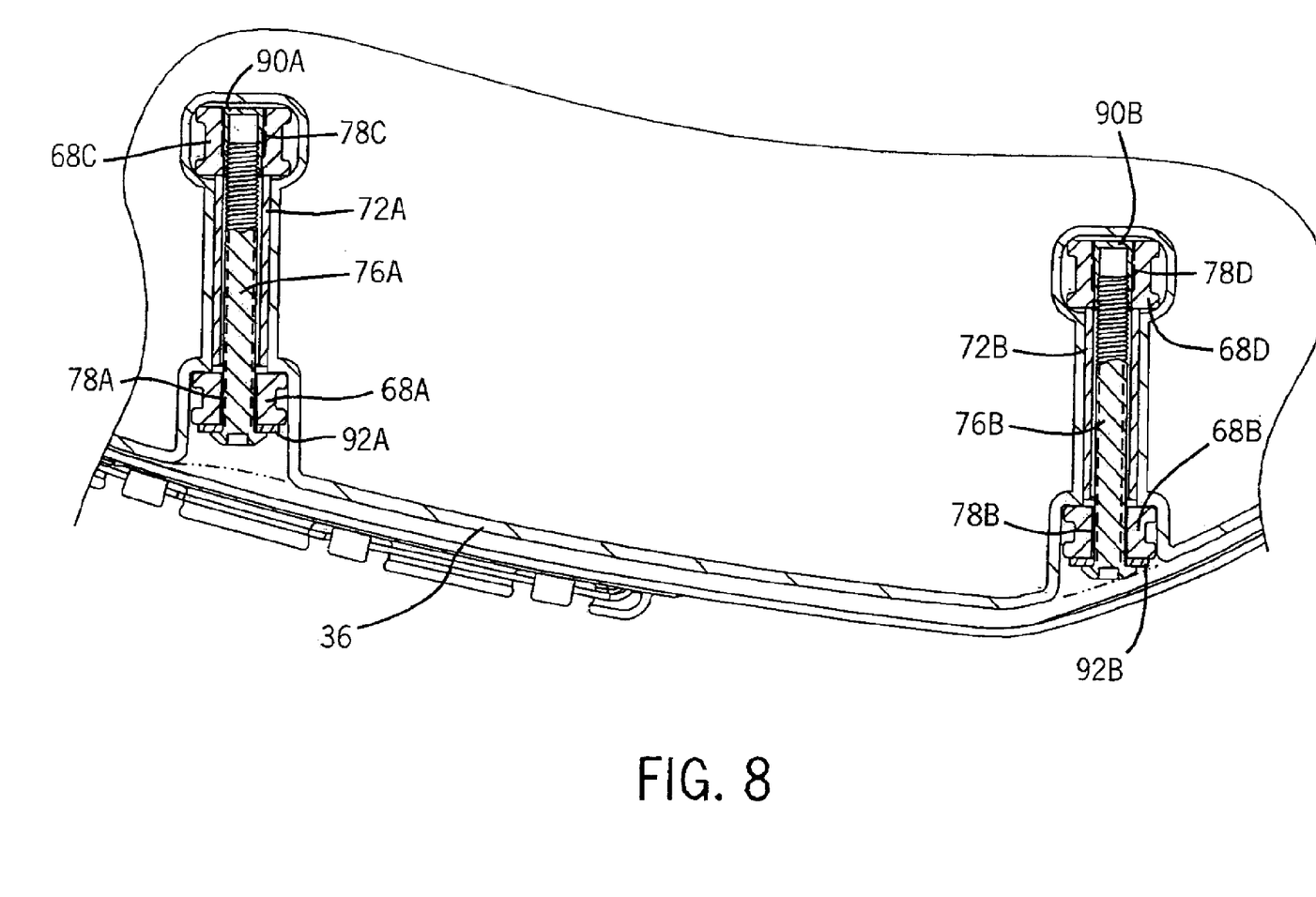
FIG. 8 is a cross-sectional view of the fuel tank and air box assembly, taken along line 8-8 of FIG. 6.
Figure 9:
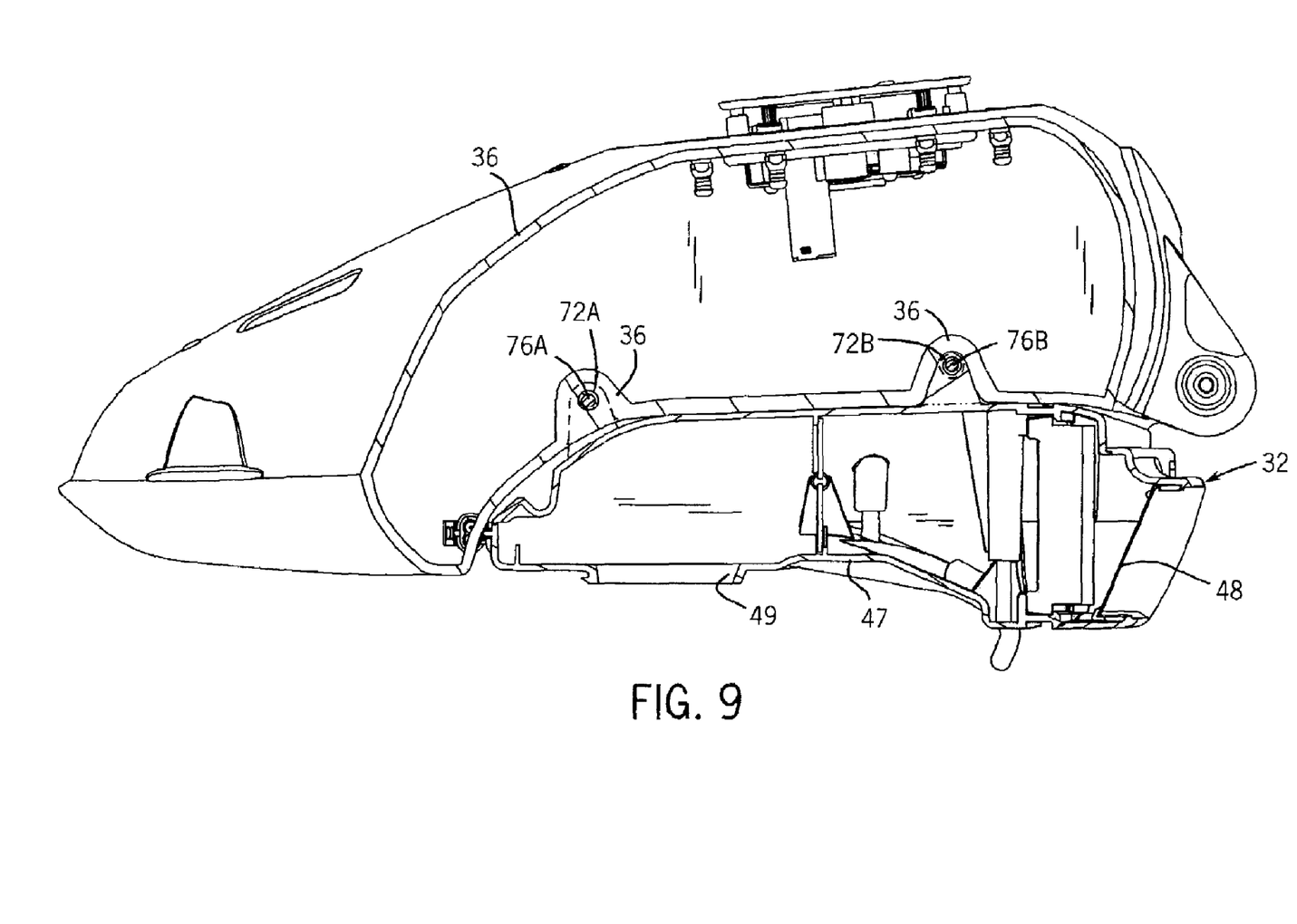
FIG. 9 is a cross-sectional view of the fuel tank and air box assembly, taken along line 9-9 of FIG. 7.

Referring to FIGS. 4 and 8, a first bushing 72A is positioned in a first bore 74A in the fuel tank 36. The first bore 74A is formed in the fuel tank 36 between the mounting recess 66A and the mounting recess 66C. A second bushing 72B is positioned in a second bore 74B in the fuel tank 36. The second bore 74B is formed in the fuel tank 36 between the mounting recess 66B and the mounting recess 66D. The bores 74A and 74B in the fuel tank 36 are not open to the interior volume of the fuel tank 36, but rather are formed in one or more solid portions of the fuel tank 36 as best shown by FIG. 9. A first fastener 76A is configured to pass through the first bushing 72A and through holes 78A and 78C in the respective mounting flanges 68A and 68C. A second fastener 76B is configured to pass through the second bushing 72B and through holes 78B and 78D in the respective the mounting flanges 68B and 68D.

FIGS. 5-10 illustrate features of the tank and air box assembly 46 with the fuel tank cover 38 removed for clarity. The fuel tank 36 is formed with a ridge 80 as shown in FIGS. 5 and 6. When the motorcycle 20 (or at least the tank and air box assembly 46) is fully assembled, a lower edge 82 of the fuel tank cover 38 abuts or lies adjacent to the ridge 80 of the fuel tank 36, creating the look of a linear seam along the side (see FIGS. 2 and 3). With the air box 32 mounted to the fuel tank 36, a ridge 86 of the air box 32 also abuts or lies adjacent to the lower edge 82 of the fuel tank cover 38. The ridge 86 is formed to follow the contour of the lower edge 82, creating the look of a linear seam that is continuous with the seam between the lower edge 82 and the ridge 80 in the fuel tank 36. Thus, the air box 32 is visually integrated into the appearance of the fuel tank 36 and fuel tank cover 38.

As best shown in FIG. 8, the mounting flanges 68C and 68D receive threaded inserts 90A and 90B, respectively. When the air box 32 is positioned with the mounting flanges 68A, 68B, 68C, and 68D in the respective mounting recesses 66A, 66B, 66C, and 66D, the fastener 76A is inserted through the mounting flange 68A, through the bushing 72A, and into the threaded insert 90A in the mounting flange 68C. Likewise, the fastener 76B is inserted through the mounting flange 68B, through the bushing 72B, and into the threaded insert 90B in the mounting flange 68D. The fasteners 76A and 76B are threaded into the threaded inserts 90A and 90B, such that the air box 32 is fastened securely with respect to the fuel tank 36. Washers 92A and 92B are positioned between the outer faces of the mounting flanges 68A and 68B and the heads of the fasteners 76A and 76B, respectively.

The fasteners 76A and 76B directly engage the air box 32, which then hangs from the first and second bores 74A and 74B in the fuel tank 36. In other embodiments, the mounting features of the air box 32 can be coupled directly or indirectly to the mounting locations of the fuel tank 36 in other manners. For example, in some embodiments, fasteners engage a threaded portion or insert in the fuel tank 36 rather than threading into the mounting features. The air box 32 can also be coupled to the fuel tank 36 with alternate types of fasteners, such as clamps, ties, snaps, hooks, adhesive, etc.

What is claimed is:

1. A fuel tank and air box assembly for a motorcycle including a motorcycle engine comprising:
    a fuel tank;
    a recess formed in the fuel tank;
    a fuel tank cover positionable over the fuel tank to at least partially cover the fuel tank, the fuel tank cover having a lower edge; and
    an air box at least partially received into the recess in the fuel tank and including
        a housing having an inlet configured to receive intake air into the housing and an outlet configured to direct the intake air from the housing to the motorcycle engine, the housing being formed with a ridge that follows a contour of the lower edge of the fuel tank cover, and
        a filter element coupled to the housing, the filter element configured to separate debris from the intake air.

2. The fuel tank and air box assembly of claim 1, wherein the fuel tank includes a lower surface and the recess in the fuel tank is formed by a surface recessed from the lower surface.

3. The fuel tank and air box assembly of claim 2, wherein the housing includes an upper surface that lies adjacent to the recessed surface.

4. The fuel tank and air box assembly of claim 3, wherein the housing includes a mounting feature, and the mounting feature extends upwardly from the upper surface and is received at a mounting location of the fuel tank.

5. The fuel tank and air box assembly of claim 4, wherein the mounting feature includes a flange portion having a hole for receiving a fastener, and the air box includes a second mounting feature including a flange portion parallel to the flange portion of the first mounting feature, the flange portion of the second mounting feature including a threaded insert configured to engage the fastener.

6. The fuel tank and air box assembly of claim 5, wherein the air box includes a third mounting feature and a fourth mounting feature, the third and fourth mounting features being formed with respective flange portions that are parallel with one another, each having a hole therethrough, the hole in the flange portion of the fourth mounting feature receiving a threaded insert, the third and fourth mounting features configured to receive a second fastener.

7. The fuel tank and air box assembly of claim 6, wherein the first fastener passes through the hole in the first mounting feature, is configured to pass through a first bushing in the fuel tank, and is engaged with the threaded insert of the second mounting feature, and the second fastener passes through the hole in the third mounting feature, is configured to pass through a second bushing in the fuel tank, and is engaged with the threaded insert of the fourth mounting feature.

8. The fuel tank and air box assembly of claim 1, wherein the housing is at least partially supported by the fuel tank.

9. The fuel tank and air box assembly of claim 1, wherein the recess in the fuel tank is open to at least one side of the fuel tank.

10. A motorcycle comprising:
    an engine;
    a fuel tank configured to store fuel to be combusted in the engine;
    an air box in fluid communication with the engine and configured to provide intake air thereto, the air box including a filter element to separate debris from the intake air, wherein the air box is mounted below the fuel tank and supported by the fuel tank; and
    a fuel tank cover positioned to cover a majority of the fuel tank, the fuel tank cover having a lower edge matching the contour of a ridge formed in the air box.

11. The motorcycle of claim 10, wherein the fuel tank includes a recess in a lower surface thereof configured to receive the air box therein, and at least a portion of the air box is positioned within the recess.

12. The motorcycle of claim 11, wherein the recess in the fuel tank is open to at least one side of the fuel tank.

13. The motorcycle of claim 10, wherein the fuel tank includes a bore configured to receive a fastener for securing the air box to the fuel tank.

14. The motorcycle of claim 13, wherein the air box includes an upper surface formed with a pair of mounting features to engage the fastener and fix the air box to the fuel tank.

15. The motorcycle of claim 14, wherein the fuel tank includes a second bore configured to receive a second fastener for securing the air box to the fuel tank and the air box includes a second pair of mounting features to engage the second fastener.

16. An air box for a motorcycle including a motorcycle engine and a fuel tank, the air box comprising:
a housing having an inlet configured to receive intake air into the housing and an outlet configured to direct the intake air from the housing to the motorcycle engine;
a filter element coupled to the housing, the filter element configured to separate debris from the intake air; and
a mounting feature extending above the inlet and configured to connect the housing below the fuel tank of the motorcycle
wherein the housing is formed with a ridge and the ridge is formed with a contour configured to match a contour of a lower edge of a fuel tank cover.

17. The air box of claim 16, wherein the housing is configured to be positioned substantially within a receiving recess formed in the fuel tank.

18. The air box of claim 17, wherein the mounting feature extends upwardly from an upper surface of the housing and is configured to be received at a mounting location in the receiving recess of the fuel tank.

19. The air box of claim 16, wherein the housing is configured to be supported by the fuel tank via the mounting feature.

20. The air box of claim 16, wherein the mounting feature includes a flange portion having a hole for receiving a fastener.

21. The air box of claim 20, further comprising a second mounting feature including a flange portion parallel to the flange portion of the first mounting feature.

22. The air box of claim 21, wherein the flange portion of the second mounting feature includes a threaded insert configured to engage the fastener.

23. The air box of claim 22, further comprising a third mounting feature and a fourth mounting feature, the third and fourth mounting features being formed with respective flange portions that are parallel with one another, each having a hole therethrough, the hole in the flange portion of the fourth mounting feature receiving a threaded insert, the third and fourth mounting features configured to receive a second fastener.

24. The air box of claim 23, wherein the first fastener passes through the hole in the first mounting feature, is configured to pass through a first bushing in the fuel tank, and is engaged with the threaded insert of the second mounting feature, and the second fastener passes through the hole in the third mounting feature, is configured to pass through a second bushing in the fuel tank, and is engaged with the threaded insert of the fourth mounting feature.

* * * * *